Jan. 31, 1967    A. W. WELSH ETAL    3,302,210
ECHO SOUNDING APPARATUS
Filed Oct. 30, 1964
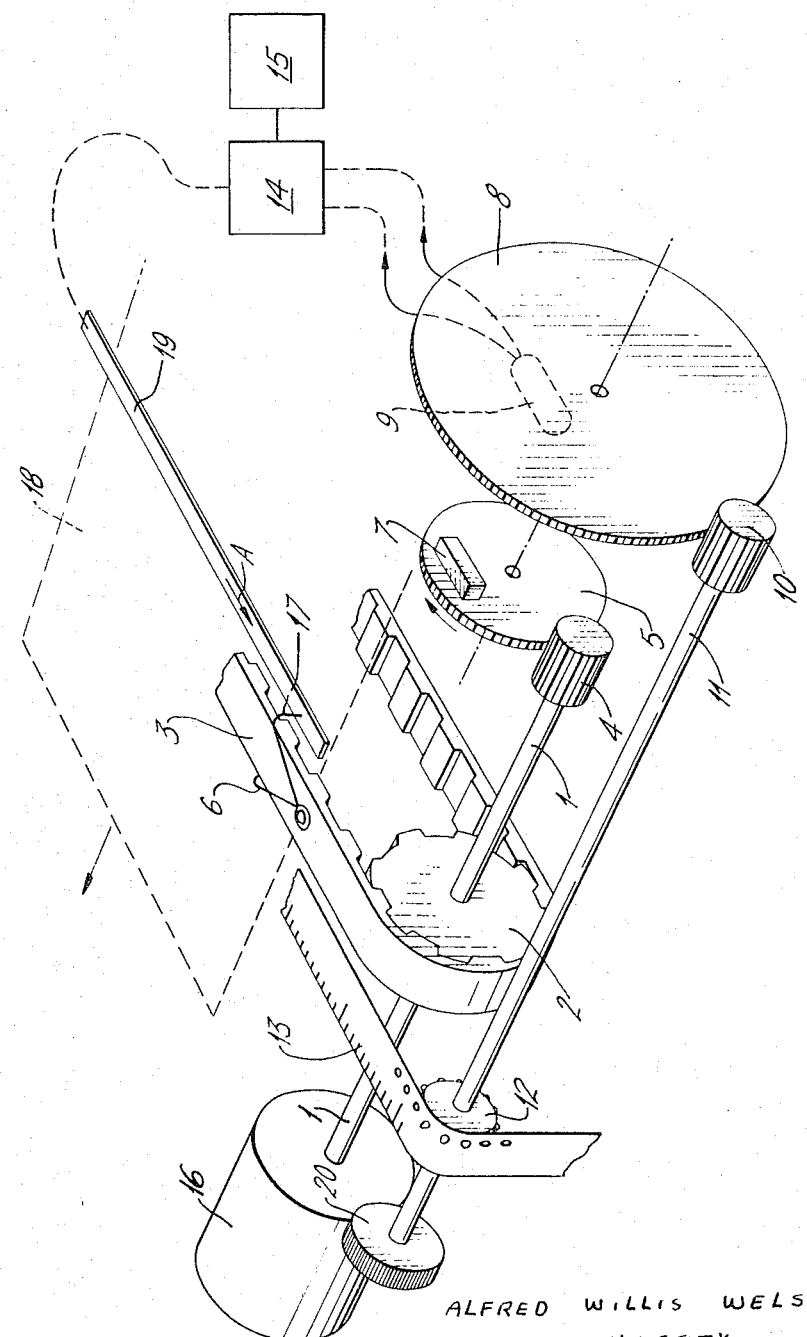
ALFRED WILLIS WELSH
KENNETH HUSSEY
    INVENTORS
Hall, Pollock + Vande Sande
    ATTORNEYS 3,302,210
ECHO SOUNDING APPARATUS
Alfred Willis Welsh, Loughton, Essex, and Kenneth Hussey, Ingatestone, Essex, England, assignors to S. Smith & Sons (England) Limited, Cricklewood, London, England, a British company
Filed Oct. 30, 1964, Ser. No. 407,647
Claims priority, application Great Britain, Nov. 7, 1963, 43,938/63
6 Claims. (Cl. 346—17)

This invention relates to echo sounding apparatus in which pulses of acoustic energy are transmitted, and echo signals received from objects are recorded. In one kind of echo sounding apparatus, a belt type recorder is employed which records the echo signals received by the apparatus on a sheet of paper. The recorder has an endless belt which is continuously driven and carries a stylus arranged to engage the paper during part of the cycle. The echo signals are fed to the stylus as the belt traverses the paper so that the stylus marks the paper. The position of a mark across the paper is dependent on the range of the target from which the echo signal was received. The paper is driven at right angles to and through the plane of motion of the stylus by a motor, either continuously, or in steps during the intervals between the receipt of echo signals arising from successive transmitted pulses. The transmission of a pulse of energy from the echo sounding apparatus is initiated at or before the instant when the stylus engages the paper.

A scale is normally provided which is disposed adjacent to and parallel with the line of motion of the stylus across the paper and which indicates the range of an object giving rise to an echo signal and a consequent mark on the paper.

According to this invention, there is provided echo sounding apparatus including control means for altering the time interval between the instant of transmission of a pulse of energy and the instant that the stylus engages the paper. The control means may be connected to a scale so as to move it in the direction of its length when the time interval is altered, whereby the scale indicates directly the range of an object giving rise to a mark on the paper.

Preferably the control means are such that the said time interval is continuously variable.

A recorder of the echo sounding apparatus may include an endless belt that carries a stylus for marking paper in accordance with received echoes. Preferably the endless belt is formed with teeth which engage mating teeth in a driving pulley, and the control means comprise switch means which may be operated to initiate the transmission of a pulse of acoustic energy. The switch means may comprise first and second elements, the first element being caused in operation to traverse a first closed path once during every complete revolution of the belt. The second element is disposed so that it may be moved manually to any point in a second closed path adjacent and similar to the first; and the switch means is operated when the first and second elements are adjacent to each other.

In use, the switch means are operated once during every revolution of the belt, and the time interval between the instant of transmission of a pulse of energy and the instant of the stylus engaging the paper may be altered by moving the second element. The interengaging teeth of the belt and the pulley prevent the belt slipping so that the position of the stylus with respect to the first element cannot change.

Preferably the first element is carried on a first rotatable member which, in operation, is driven so as to complete one revolution during each cycle of the belt, and the second element is carried on a second rotatable member which is co-axial with the first rotatable member and is manually rotatable.

In one preferred arrangement, one of the first and second elements is a permanent magnet and the other is a switch which is operated when the magnet is adjacent to it.

In another preferred arrangement one of the first and second elements is a brush and the other is a contact strip.

An echo sounding apparatus constructed in accordance with the present invention will now be described. The accompanying drawing is a schematic showing of one form which the apparatus may take.

The echo sounding apparatus has a transmitter/receiver 14 to which is connected a transmitting/receiving transducer 15. The transmitter/receiver 14 is controlled by a dry reed switch 9 and generates sonic or ultrasonic energy when the switch 9 is closed. Echo signals received by the transducer 15 are amplified by the transmitter/receiver 14 and are fed to a stylus 6 in the manner described below.

A shaft 1 is driven by a motor 16 in the counter-clockwise direction (as viewed from the right-hand side of the drawing) and carries a toothed pulley 2 which engages a toothed belt 3. The belt 3 carries the stylus 6 which, as the shaft 1 is rotated, engages and is drawn in a straight line across a sheet of electrolytic paper (indicated in dotted outline at 18).

The stylus 6 is connected to a contact 17 which during the period that the stylus 6 engages the paper 18, is in contact with a strip of metal 19 connected to the transmitter/receiver 14. The paper 18 rests against a grounded platen (not shown) and when an echo signal is received, current passes from the stylus 6 to the platen through the paper 18, thereby marking it.

The paper 18 is moved slowly in the direction of the axis of the shaft 1 through the belt 3 and is wound on rollers (not shown).

A pinion 4 is mounted on the shaft 1 and engages a gear wheel 5. The length of the belt 3, the diameter of the pulley 2, and the gear ratio between the pinion 4 and the gear wheel 5 are such that the gear wheel 5 completes one complete revolution for each complete revolution of the belt 3. The gear wheel 5 carries a permanent magnet 7, and is adjacent to a co-axial gear wheel 8 which carries the switch 9, the switch 9 being operated under the influence of the magnetic field of the magnet 7 when it is adjacent to the magnet 7. The switch 9 is connected through slip rings (not shown) to the transmitter/receiver 14. The gear wheel 8 engages a pinion 10 mounted on a shaft 11 which also carries a toothed sprocket 12 and a manually operable adjusting knob 20. The toothed sprocket 12 engages a co-operating perforated transparent scale 13 which lies above the paper adjacent to the belt 3. The scale 13 may be calibrated in units of range, for example, in fathoms, and its length is preferably the same as that of the belt 3 or an integral multiple of the length of the belt 3.

In operation, the shaft 1 is rotated by the motor 16 in the counter-clockwise direction. The magnet 7 is accordingly rotated in the clockwise direction and comes into proximity with the switch 9, thereby operating it for a short period and initiating the transmission of a pulse of sonic or ultrasonic energy from the transducer 15. The stylus 6 at the instant the switch 9 is operated or subsequently, engages the paper 18 and moves across it in the direction indicated by the arrow A. If an echo signal is received by the transducer 15, it is fed through the transmitter/receiver 14 to the stylus 6 and a current passes through the paper 18. The range of the target giving rise to the echo signal may be read directly off the scale 13. The shaft 11 may be rotated manually in the clockwise direction to advance the instant of transmission of energy and to increase the time interval between the instant of transmission of a pulse of energy and the instant the stylus 6 engages the paper. The stylus 6 can then only record signals received from an increased range from the transducer 15. As the shaft 11 is rotated in the clockwise direction, the switch 9 and the gear wheel 8 are rotated in the counter-clockwise direction, advancing the instant of proximity of the magnet 7 to the switch 9. The scale 13 is moved across the paper in the direction opposite to that indicated by the arrow A and indicates a greater range for any particular position on the paper 18. Similarly, the shaft 11 may be rotated in the counterclockwise direction to retard the transmission of pulses of energy, and in this case the scale 13 is moved in the direction of the arrow A across the paper, and indicates a shorter range for any particular position on the paper.

The motor 16 may be constructed so that it can drive the shaft 1 at more than one speed. A mark on the paper 18 corresponds to a different range for each motor speed and separate markings are provided on the scale 13 for each motor speed.

In a modification, the magnet 7 is replaced by a brush connected to the transmitter/receiver 14 through a slip ring, and the switch 9 is replaced by a contact strip with which the brush can co-operate and which is connected to the transmitter/receiver 14 through a slip ring.

The term "acoustic energy" used in the above description, and in the appended claims, is not intended to limit the present invention to wave energy solely within the audible frequency range.

Having thus described our invention, we claim:

1. Echo sounding apparatus comprising transmitting means operable to transmit a pulse of acoustic energy, receiving means for receiving echoes of said pulse, and recording means coupled to said receiving means for recording said received echoes on a recording medium, said recording means including a stylus for marking said medium in accordance with reception of echoes by said receiving means, a belt carrying said stylus, driving means for driving said belt to carry said stylus around a closed path traversing said medium, switch means actuable to operate said transmitting means to transmit a pulse of acoustic energy, said switch means having first and second parts that are both moveable into a predetermined cooperating relationship with one another to effect actuation of said switch means, means coupled to said driving means for driving said first part around a closed path in synchronism with the closed-path movement of said stylus, and means for varying the range of echo signals to be recorded comprising manually adjustable means for positioning said second part adjacent a point in the path of movement of said first part to achieve said predetermined cooperating relationship with said first part when the said first part passes said point, said point being variable throughout at least a major portion of said path of movement of said first part by adjustment of said manually adjustable means thereby to vary the timing within the closed-path movement of said stylus at which said switch means is actuated.

2. Echo sounding apparatus according to claim 1 wherein one of said first and second parts comprises a magnetically-actuable switch, the other of said first and second parts comprising a magnet providing a magnetic field operable to actuate said magnetically-actuable switch.

3. Echo sounding apparatus comprising transmitting means operable to transmit a pulse of acoustic energy, receiving means for receiving echoes of said pulse, and recording means coupled to said receiving means for recording received echoes on a recording medium, said recording means including a marking element for marking said medium in accordance with reception of echoes by said receiving means, driving means for driving said marking element around a closed path traversing said medium, switch means actuable to operate said transmitting means to transmit a pulse of energy, said switch means having first and second parts that are both moveable into a predetermined cooperating relationship with one another to effect actuation of said switch means, means coupled to said driving means for driving said first part around a closed path in synchronism with the closed-path movement of said marking element, and manually adjustable means for positioning said second part adjacent any selected point throughout the whole path of movement of said first part, said manually adjustable means positioning said second part adjacent said selected point to achieve said predetermined cooperating relationship with said first part when the said first part passes said selected point.

4. Echo sounding apparatus according to claim 3 including an elongated calibrated scale extending lengthwise across said recording medium, and means responsive to adjustment of said manually adjustable means to move said scale lengthwise relative to said recording medium.

5. Echo sounding apparatus according to claim 3 wherein said second part is a magnetically-actuable electric switch, and said first part is a permanent magnet for providing a magnetic field to actuate said magnetically-actuable switch.

6. Echo sounding apparatus comprising transmitting means operable to transmit a pulse of acoustic energy, receiving means for receiving echoes of said pulse, and recording means coupled to said receiving means for recording said received echoes on a recording medium, said recording means including a stylus for marking said medium in accordance with reception of echoes by said receiving means, a belt carrying said stylus, driving means for driving said belt to carry said stylus around a closed path traversing said medium, switch means actuable to operate said transmitting means to transmit a pulse of acoustic energy, said switch means having first and second parts that are both movable into a predetermined cooperating relationship with one another to effect actuation of said switch means, means coupled to said driving means for driving said first part around a closed path in synchronism with the closed-path movement of said stylus, manually adjustable means for positioning said second part adjacent a point in the path of movement of said first part to achieve said predetermined cooperating relationship with said first part when the said first part passes said point, said point being variable selectively by adjustment of said manually adjustable means thereby to vary the timing within the closed-path movement of said stylus at which said switch means is actuated, an elongated scale calibrated lengthwise in units of range, and means coupled to said manually adjustable means for moving said scale lengthwise across said recording medium in accordance with the adjustment of said manually adjustable means.

References Cited by the Examiner
UNITED STATES PATENTS

| 2,883,642 | 4/1959 | Kietz | 346—33 |
| 2,941,183 | 6/1960 | Bischof | 346—33 |
| 3,164,435 | 1/1965 | Grafstein et al. | 346—139 |

RICHARD B. WILKINSON, *Primary Examiner.*

J. G. MURRAY, H. B. KATZ, *Assistant Examiners.*